Figure 4:
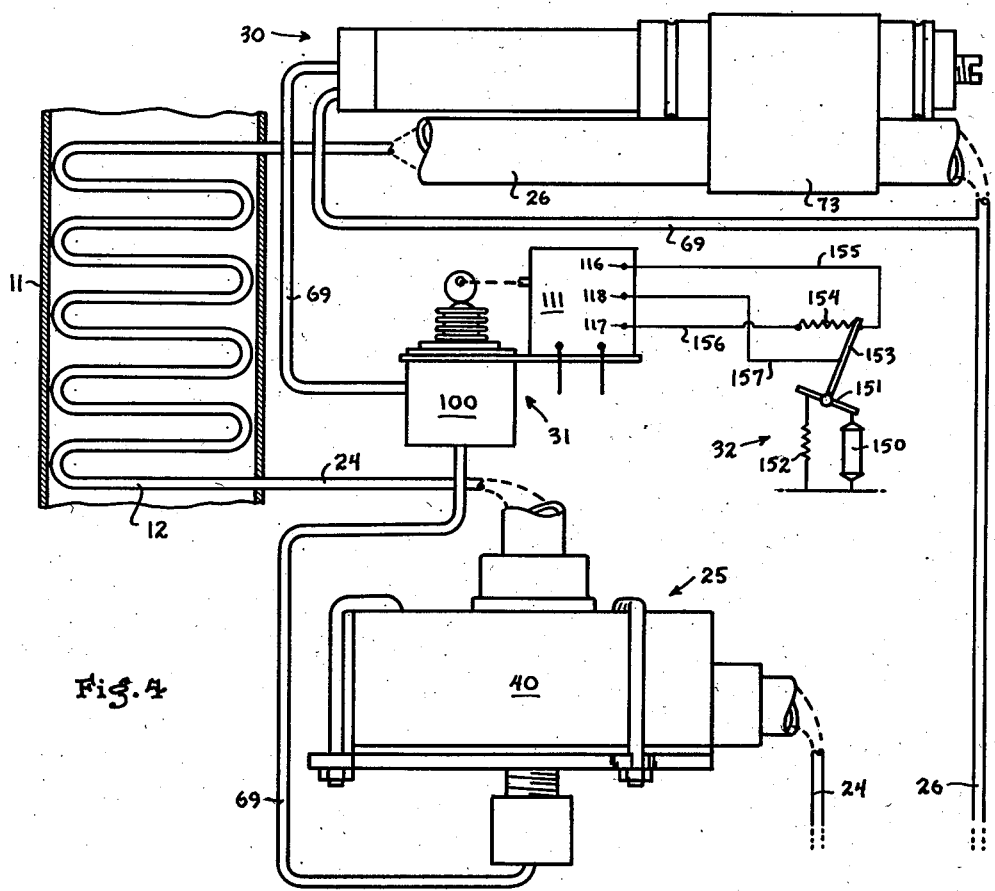

Jan. 16, 1945.  A. B. NEWTON  2,367,304
REFRIGERATION CONTROL SYSTEM
Filed Oct. 20, 1939  5 Sheets-Sheet 1
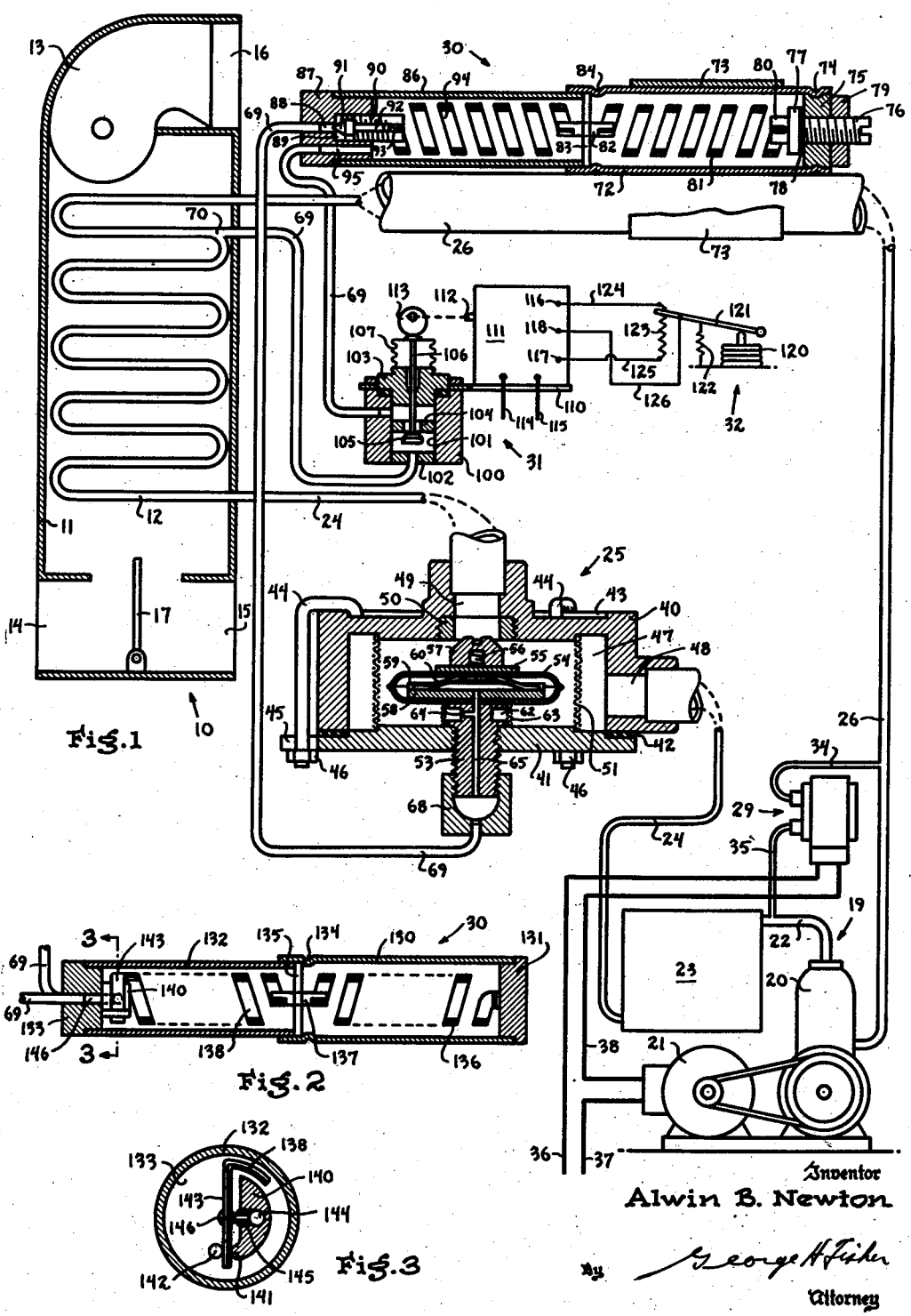
Inventor
Alwin B. Newton
By George H. Fisher
Attorney Jan. 16, 1945.　　　A. B. NEWTON　　　2,367,304
REFRIGERATION CONTROL SYSTEM
Filed Oct. 20, 1939　　　5 Sheets-Sheet 2

Inventor
Alwin B. Newton
By George H. Fisher
Attorney

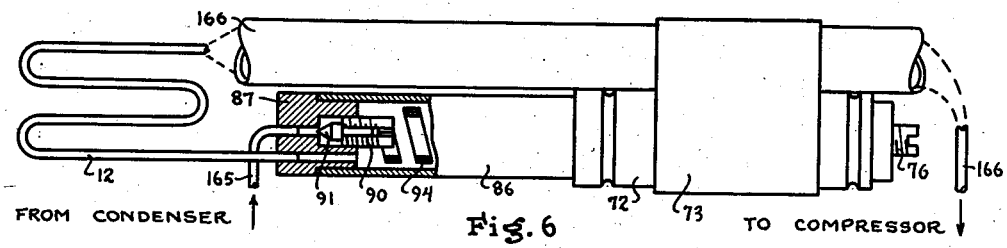
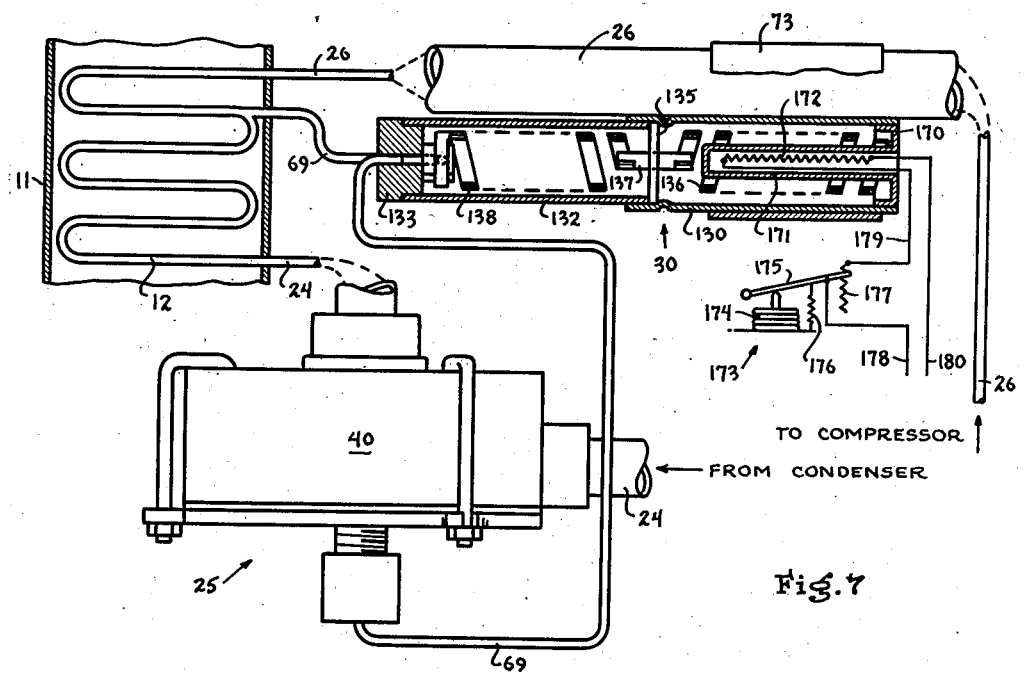
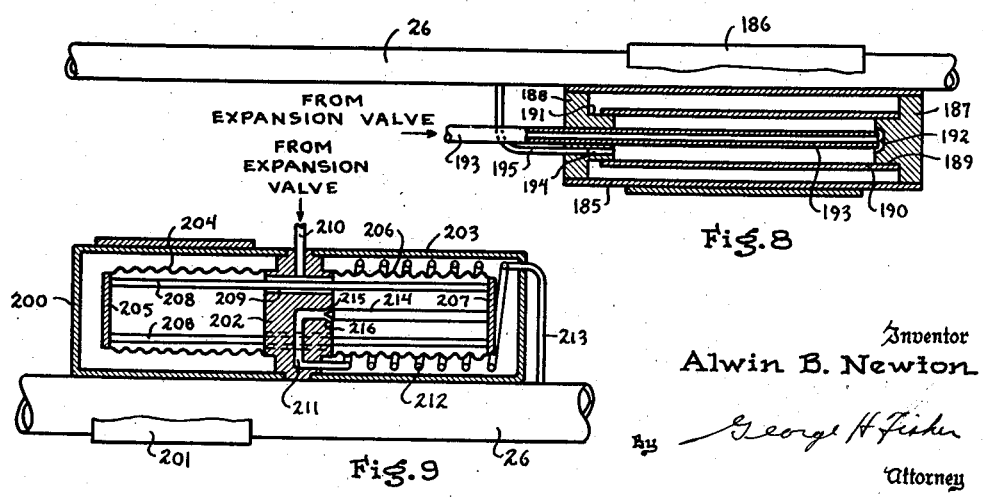

Jan. 16, 1945.　　　A. B. NEWTON　　　2,367,304
REFRIGERATION CONTROL SYSTEM
Filed Oct. 20, 1939　　　5 Sheets-Sheet 4

Inventor
Alwin B. Newton
By George H. Fisher
Attorney

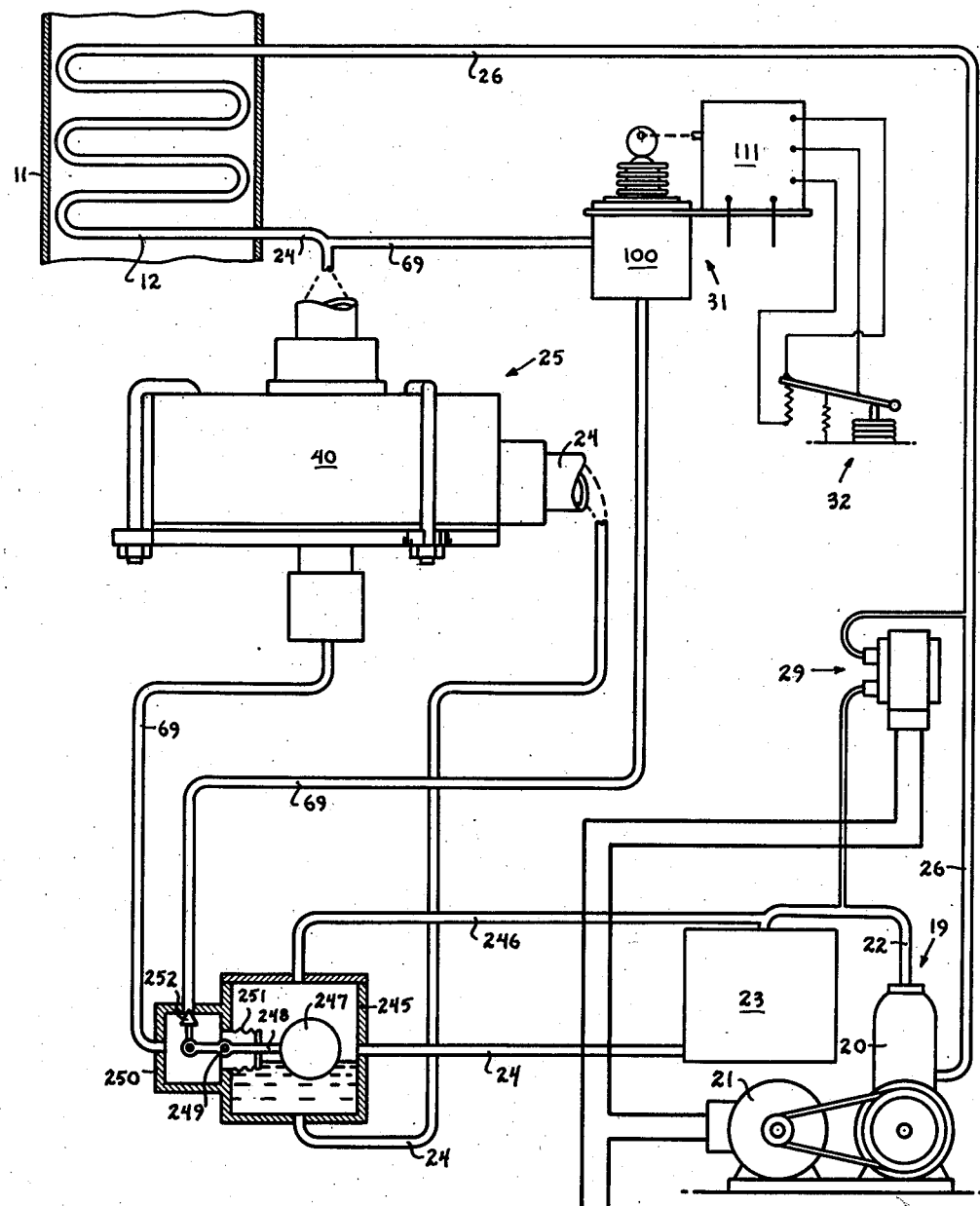

Patented Jan. 16, 1945

2,367,304

UNITED STATES PATENT OFFICE 2,367,304

REFRIGERATION CONTROL SYSTEM

Alwin B. Newton, Minneapolis, Minn., assignor to Minneapolis-Honeywell Regulator Company, Minneapolis, Minn., a corporation of Delaware Application October 20, 1939, Serial No. 300,400

27 Claims. (Cl. 62—6)

This invention relates to control systems for a refrigerating apparatus having an evaporator for controlling the condition of a medium and more particularly to the control of the expansion valve which regulates the flow of refrigerant to the evaporator.

An object of this invention is to provide pressure operated means for perating the expansion valve wherein refrigerant from the high pressure side of the refrigerating apparatus is supplied to the pressure operated means and is then bled from the pressure operated means to the low pressure side of the refrigerating apparatus for the purpose of operating the pressure operated means and hence the expansion valve along with control means for controlling the flow of refrigerant to and from the pressure operated means to position adjustably the expansion valve.

A further object of this invention is to operate the control means which controls the position of the expansion valve by means responsive to various conditions such as the condition of the medium being controlled by the evaporator, the pressure of the refrigerant in the evaporator, the amount of refrigerant in the evaporator and combinations thereof. The control means may also be manually operated to position adjustably the expansion valve. The means responsive to the amount of refrigerant in the evaporator may take various forms such as a high pressure float, a low pressure float or a device responsive to the superheat of the refrigerant at the evaporator outlet. The means responsive to the condition of the medium being controlled by the evaporator may operate directly on its control means for controlling directly the flow of the refrigerant to and from the pressure operated expansion valve or it may operate through the other control means such as by applying auxiliary heat to the thermal element of the superheat responsive device.

Another object of this invention is to provide a new and novel device actuated in accordance with the pressure of the refrigerant in the evaporator which may be utilized for operating the control means to position the expansion valve for maintaining desired pressure conditions in the evaporator. This device may comprise a thermostatic means, means for evaporating liquid refrigerant adjacent the thermostatic means so that the thermostatic means operates in accordance with the vaporization temperature of the refrigerant and means for subjecting the refrigerant adjacent the thermostatic means to the pressure within the evaporator to cause the temperature thereof to correspond to the pressure in the evaporator whereby the thermostatic means operates in accordance with the pressure in the evaporator.

Still another object of this invention is to provide a new and novel device actuated in accordance with the temperature and pressure and hence the superheat of the refrigerant at the evaporator outlet which may be utilized for operating the control means to position the expansion valve for maintaining the superheat conditions at the evaporator outlet at desired values. This device may comprise first thermostatic means responsive to the temperature of the superheated refrigerant at the evaporator outlet so that it operates in accordance with the temperature thereof, second thermostatic means operating in opposition to the first thermostatic means, means for evaporating liquid refrigerant adjacent the second thermostatic means so that the second thermostatic means operates in accordance with the vaporization temperature of the refrigerant and means for subjecting the refrigerant adjacent the second thermostatic means to the pressure within the evaporator to cause the temperature thereof to correspond to the pressure in the evaporator whereby the second thermostatic means operates in accordance with the pressure in the evaporator.

A further object of this invention is to utilize the refrigerant which is bled from the pressure operated means of the expansion valve and which controls the operation thereof as the refrigerant which is vaporized adjacent the thermostatic means of the pressure responsive and the superheat responsive devices.

Another object of this invention resides in the use of the above pressure responsive and the superheat responsive devices for controlling the expansion valve of the refrigerating apparatus directly especially where the refrigerating apparatus is of small capacity.

Other objects of this invention reside in the details of construction of the pressure operated expansion valve and the various control devices associated therewith.

Figure 5:
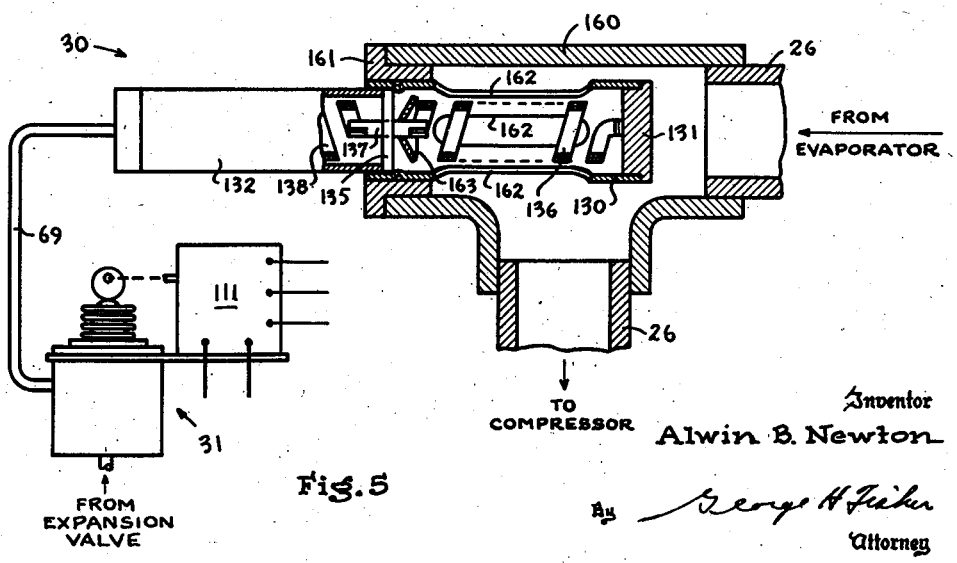
Figure 10:
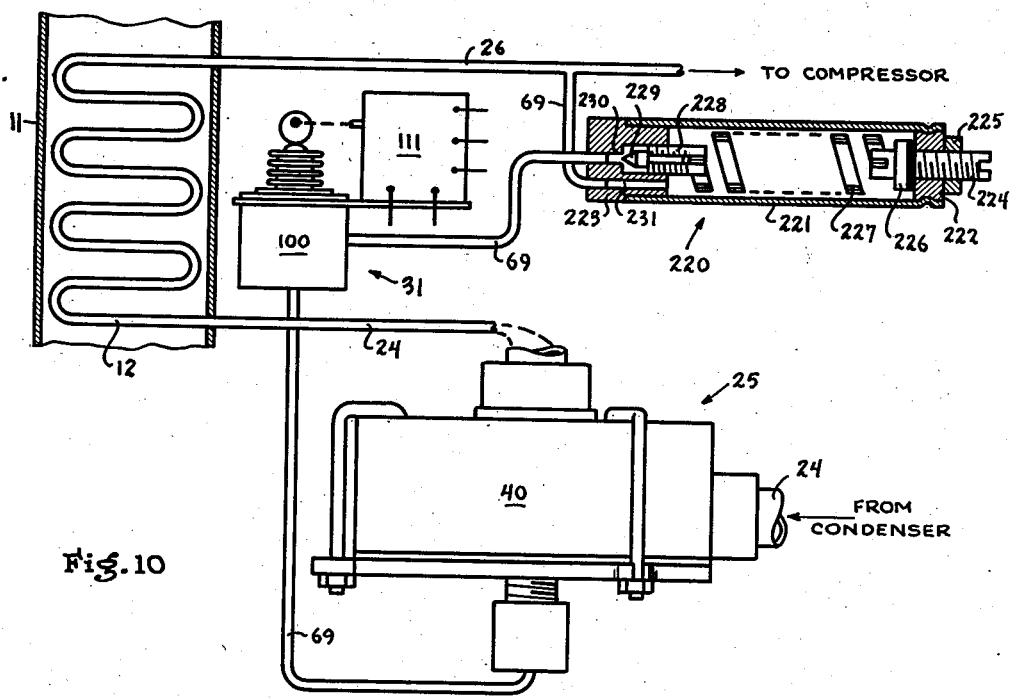
Figure 11:
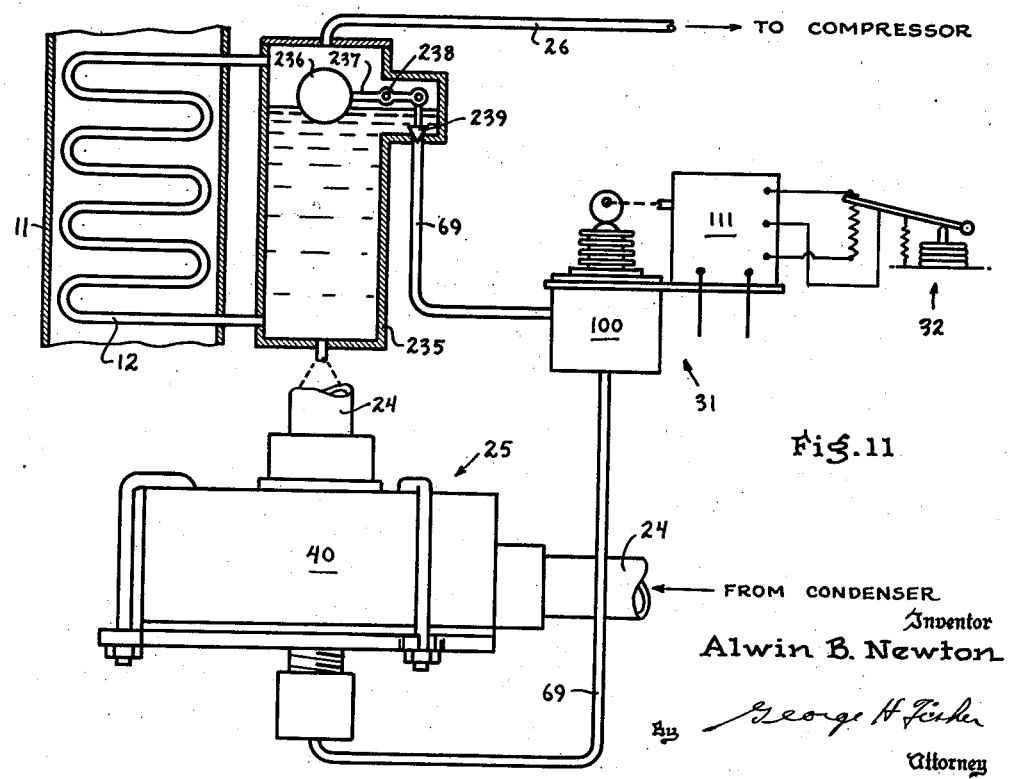

Further objects will become apparent to those skilled in the art upon reference to the accompanying specification, claims and drawings, in which:

Figure 1 is a diagrammatic illustration of a refrigerating apparatus provided with the pressure operated expansion valve, the superheat responsive control device and the control device responsive to the condition of the medium being controlled by the evaporator. Here the superheat responsive device is located in the bleed line between the pressure operated expansion valve and the control device responsive to the condition of the medium, Figure 2 is a detailed sectional view of a modified form of the superheat and responsive device, Figure 3 is an enlarged sectional view of the modified form of the superheat responsive device taken substantially along the line 3—3 of Figure 2, Figure 4 is a view similar to Figure 1 but showing the control device responsive to the condition of the medium being controlled by the evaporator located in the bleed line between the pressure operated expansion valve and the superheat responsive device, Figure 5 is a view of a modified form of the superheat responsive device adapted for direct mounting in the evaporator outlet, Figure 6 is an illustration showing how the superheat responsive device may control directly the expansion valve, Figure 7 is a view showing how the setting of the superheat responsive device may be adjusted by applying auxiliary heat to the temperature responsive element thereof under the control of the control device responsive to the condition of the medium being controlled by the evaporator, Figure 8 is a sectional view of still another modified superheat responsive device using linearly expanding thermostatic elements in place of bimetallic thermostatic elements, Figure 9 is a sectional view of a modified superheat responsive device using bellows charged with a volatile fluid as thermostatic elements, Figure 10 is a diagrammatic view showing the pressure responsive device for controlling the pressure operated expansive valve, Figure 11 is a diagrammatic view showing a low pressure float for controlling the pressure operated expansion valve, and Figure 12 is a diagrammatic view showing a high pressure float for controlling the pressure operated expansion valve.

Referring now to Figure 1 an air conditioning unit for conditioning the air of a space is generally designated at 10. This air conditioning unit may comprise a casing 11 in which is mounted a cooling coil in the form of an evaporator 12. A fan 13 circulates air from a fresh air duct 14 and a return air duct 15 over the evaporator 12 for cooling the same and for discharging the cooled air out through an opening 16 into the space to be conditioned. A damper 17 may be utilized for varying the amounts of fresh and return air which are conditioned by the conditioning unit.

Refrigerant is supplied to and withdrawn from the evaporator 12 by means of a refrigerating apparatus generally designated at 19. This refrigerating apparatus may comprise a compressor 20 operated by an electric motor 21 for discharging compressed refrigerant through a high pressure line 22 into a condenser 23. Condensed refrigerant flows from the condenser 23 through a liquid line 24 to the evaporator 12. An expansion valve generally designated at 25 is utilized for controlling the flow of refrigerant to the evaporator 12. Refrigerant is withdrawn from the evaporator 12 through a suction line 26 by the compressor 20. While a mechanical refrigerating apparatus is disclosed for purposes of illustration an absorption or other type of refrigerating apparatus may be utilized.

The compressor motor 21 and hence the compressor 20 may be controlled by a combination suction pressure and head pressure responsive controller generally designated at 29. The expansion valve 25 is controlled by a superheat responsive controller generally designated at 30 and may also be controlled by an additional control device generally designated at 31 which in turn may be controlled by a device 32 responsive to the condition of the medium being controlled by the evaporator such as space temperature or relative humidity. The superheat responsive control device 30 positions the expansion valve 25 to maintain a desired amount of liquid refrigerant within the evaporator 12 and the control device 31 controlled in accordance with the condition of the medium being controlled by the evaporator may be utilized for varying the superheat of the refrigerant at the evaporator outlet and hence for varying the amount of liquid refrigerant within the evaporator 12.

The combination suction pressure and head pressure responsive controller 29 may be of the type shown and described in application Serial No. 196,447, filed March 17, 1938, by Albert L. Judson and Carl G. Kronmiller. This application became Patent No. 2,244,783 on June 10, 1941. This combination controller may be connected by a pipe 34 to the suction line 26 and by a pipe 35 to the high pressure line 22 so that the controller is operated in accordance with the suction pressure and the head pressure. Power is supplied to the compressor motor 21 by means of line wires 36 and 37 leading from some source of power, not shown. When the suction pressure increases to a predetermined high value and the head pressure decreases to a predetermined low value a circuit is completed from the line wire 36 through the controller 29, wire 38 and compressor motor 21 back to the other line wire 37. Completion of this circuit causes operation of the compressor motor 21 and hence the compressor 20 to circulate refrigerant through the refrigerating system. When either the suction pressure decreases to a predetermined low value or the head pressure increases to a predetermined high value the electric circuit to the compressor motor 21 is interrupted and the compressor motor and hence the compressor are shut down. Accordingly the controller 29 operates to maintain the suction pressure and hence the pressure in the evaporator 12 within certain limits.

The expansion valve 25 may comprise a hollow casing 40 to which is secured a complementary cover 41 to form an internal chamber 47. A gasket 42 between the casing 40 and the cover 41 seals the joint to prevent the escape of refrigerant. The casing 40 is provided with an annular flange 43 over which are connected bolts 44. The bolts extend downwardly through ears 45 formed on the cover 41 and nuts 46 screw-threadedly mounted on the bolts 44 clamp the casing 40 and the cover 41 together. The casing 40 is provided with an opening 48 in which is secured the liquid line 24 leading from the condenser 23 so that the chamber 47 within the casing 40 is at all times filled with liquid refrigerant. The casing 40 is also provided with a passage 49 in which is secured the liquid line 24 leading to the evaporator 12 for delivering liquid refrigerant from the chamber 47 to the evaporator 12. A replaceable valve seat 50 is screw-threadedly mounted in the passage 49. An annular screen 51 is located within the chamber 47 to screen the liquid refrigerant as it passes from the passage 48 through the chamber 47 into the passage 49.

Screw-threadedly mounted in the cover 41 is a nipple 53 and on the inner end of this nipple there is secured an enclosed expansible chamber 54 in the form of a double diaphragm. Secured to the enclosed expansible chamber 54 is a plate 55 carrying a stud 56 upon which is screw-threadedly mounted a valve element 57 which cooperates with the removable valve seat 50. Located within the expansible chamber 54 is a block or spacer 58 which limits the collapsing movement of the expansible chamber 54 to prevent rupture of the same by excess movement. The spacer or block 58 is provided with a slot 59 in which is located a leaf spring 60 which engages the upper wall of the expansible chamber 54. The leaf spring 60 operates to spread the walls of the expansible chamber 54 to move the valve element 57 into engagement with the removable valve seat 50. When the pressure outside the expansible chamber 54 becomes greater than the combined effect of the pressure within the same and the effort of the spring 60, the valve element 57 is moved away from its seat 50 but as the internal pressure increases the valve element 57 is moved towards its seat.

The nipple 53 is provided with an annular groove 62 around which is mounted a screen 63 for screening the refrigerant that enters this annular groove. A passage 64 connects the annular groove 62 to a vertical passage 65 in the nipple 53 which extends into communication with the interior of the expansible chamber 54. The passage 64 forms a fixed orifice for metering liquid refrigerant from the chamber 47 into the interior of the expansible chamber 54. Mounted on the outer end of the nipple 53 is a fitting 68 in which is secured a bleed line 69. The bleed line 69 as shown extends to a point 70 in the evaporator 12 for bleeding refrigerant from the interior of the expansible chamber 54 to the last pass of the evaporator 70. The superheat responsive control device 30 and the other control device 31 are utilized for regulating the bleeding of refrigerant from the expansible chamber 54. As the bleeding action is increased the pressure within the expansible chamber 54 decreases so that the valve 57 is moved towards an open position and as the bleeding action is decreased the valve element 57 is moved towards its seat 50. Thus the valve element 57 is positioned with respect to its valve seat 50 in accordance with the rate of bleeding of the refrigerant from the interior of the expansible chamber 54. While the bleed line 69 is shown as connected into the last pass of the evaporator 12 as at 70, it may be connected anywhere on the downstream side of the expansion valve 25, for example, at a point adjacent the inlet of the evaporator 12 or in the suction line 26.

The superheat responsive device 30 may comprise a tube 72 which is strapped by means of a strap 73 to the suction line 26 at the outlet of the evaporator 12. The tube 72 therefore has a temperature corresponding to the temperature of the refrigerant leaving the evaporator 12. The tube 72 is provided with an annular recess 74 for fastening the tube 72 to an end wall 75. The tube 72 may be soldered to the end wall 75 for sealing the joint. Screw-threadedly mounted in the end wall 75 is a screw 76 which is provided on the inner end with a shoulder 77. A gasket 78 interposed between the shoulder 77 and the end wall 75 seals the screw 76 so that refrigerant will not escape from within the tube 72. The screw 76 may be rotated for adjustment purposes and after the proper adjustment has been made it may be locked in place by a lock nut 79 screw-threadedly mounted on the screw 76. The shoulder 77 is provided with a slot 80 in which is secured one end of a bimetallic element 81. The other end of the bimetallic element 81 is connected to a pin 82 which is rotatably mounted in a wall 83 which in turn is located within the tube 72. An annular detent 84 serves to hold the wall 83 in its proper position. The thermostatic element 81 responds to the temperature of the tube 72 and operates to rotate the pin 82 upon changes in temperature in the tube 72. Since the temperature of the tube 72 corresponds to the temperature of the refrigerant leaving the evaporator 12, the thermostatic element 81 operates the pin 82 in accordance with the temperature of the refrigerant at the evaporator outlet.

A second tube 86 fits telescopically into the first tube 72 and is soldered in place to prevent the escape of refrigerant through this joint. It is here noted that the second tube 86 is not in contact with the suction line 26 so that it is not affected by the temperature of the refrigerant leaving the evaporator as much as the tube 72 is affected. A closure member 87 is secured to the other end of the tube 86 and may be soldered in place to prevent leakage of refrigerant past the joint. The closure member 87 is provided with a passage 88 in which is secured the bleed line 69 leading from the expansion valve 25. The passage 88 is counterbored as at 89 to form a valve seat and the counterbore is provided with screw threads for receiving a rotatable screw plug 90. The screw plug 90 carries a valve element 91 which cooperates with the valve seat to regulate the flow of refrigerant from the bleed pipe 69 into the interior of the tube 86. The screw plug 90 is provided with a groove 92 so that refrigerant may pass from valve 91 into the tube 86. The inner end of the screw plug 90 is provided with a slot 93 in which is secured one end of a bimetallic element 94. The other end of the bimetallic element 94 is secured to the rotatable pin 82 mounted in the wall 83. The closure 87 is provided with a passage 95 in which is secured the bleed line 69 leading from the control device 30 to the low pressure side of the refrigerating apparatus for carrying off refrigerant from the tube 86. Some of the refrigerant which passes the valve 91 into the tube 86 vaporizes therein adjacent the bimetallic element 94 so that the bimetallic element 94 responds to the vaporization temperature of the refrigerant. Since the interior of the tube 86 is in communication with the evaporator 12, the pressure within the tube 86 corresponds to the pressure within the evaporator 12 and since the vaporization temperature of the refrigerant varies directly in accordance with the pressure, then the bimetallic element 94 operates in accordance with the pressure in the evaporator 12. The wall 83 tends to prevent the flow of liquid refrigerant into the tube 72 largely because equal pressures exist on both sides of the wall 83. However, if any liquid refrigerant does enter the tube 72 it immediately vaporizes before it can affect the bimetallic element 81 because the tube 72 is relatively warm. Accordingly, the bimetallic element 81 operates solely in accordance with the temperature of the refrigerant at the evaporator outlet. The tubes 72 and 86 are preferably made of stainless steel or other material of relatively poor heat conducting characteristics to reduce the conduction of heat from the tube 72 to the tube 86.

It is thus seen that the bimetallic element 81 operates in accordance with the actual temperature of the superheated refrigerant leaving the evaporator 12 while the bimetallic element 94 operates in accordance with the vaporization temperature at the evaporator pressure and therefore operates in accordance with the pressure in the evaporator 12. Upon an increase in temperature of the superheated refrigerant at the evaporator outlet the bimetallic element 81 operates to move the valve 91 towards an open position which causes opening movement of the expansion valve 25 to deliver more refrigerant to the evaporator 12. Conversely, upon a decrease in temperature of the superheated refrigerant the bimetallic element 81 operates to close the valve 91 to move the expansion valve 25 towards a closed position to decrease the flow of refrigerant into the evaporator 12. The bimetallic element 94 operates in opposition to the bimetallic element 81 so that upon an increase in pressure in the evaporator 12, the bimetallic element 94 operates to move the valve 91 towards a closed position which moves the expansion valve 25 towards a closed position to decrease the flow of refrigerant into the evaporator 12. Upon a decrease in evaporator pressure the bimetallic element 94 moves the valve 91 towards the open position which in turn moves the expansion valve 25 towards the open position to increase the supply of refrigerant to the evaporator 12. Thus the two bimetallic elements 81 and 94 operate conjointly to control the valve 91 which in turn controls the expansion valve 25 to maintain a desired degree of superheat at the evaporator outlet. By rotating the screw 76 the position of the valve 91 with respect to its seat may be varied for given temperature and pressure conditions and therefore the amount of superheat which is maintained at the evaporator outlet may be varied at will. The valve member 91 or the valve seat cooperating therewith is preferably slightly scored so that a small amount of refrigerant will at all times leak from the bleed line 69 into the tube 86 to keep the bimetallic element 94 wet with liquid refrigerant. Instead of scoring the valve member 91 or its seat, a separate small by-pass could be placed around the valve member 69 for accomplishing this result.

Instead of adjusting the superheat of the refrigerant that is maintained at the evaporator outlet by the screw 76, the amount of superheat maintained at the evaporator outlet may be adjusted by the control device 31 which also controls the bleed line 69. This control device 31 may comprise a casing 100 having an internal chamber 101. The lower end of the chamber 101 is closed by a wall 102 in which is secured the bleed line 69 leading to the evaporator 12. The upper end of the chamber 101 is closed by a wall 103 and the chamber 101 is divided into an inlet and an outlet chamber by a partition 104 provided with a valve seat. A valve 105 cooperates with the valve seat to control the flow of refrigerant from the inlet chamber to the outlet chamber and hence to control the bleeding action of the bleed line 69. The valve 105 is provided with a valve stem 106 which extends upwardly through the upper wall 103 and a sealing bellows 107 is utilized for the purpose of preventing the escape of refrigerant along the valve stem 106.

When the valve 105 is wide open, as shown, the interior of the tube 86 is connected directly to the evaporator 12 so that the pressure existing therein corresponds to the pressure in the evaporator 12 and the superheat responsive controller 30 operates to maintain a fixed superheat at the evaporator outlet, say 10° of superheat. As the valve 105 is moved toward the closed position the connection between the interior of the tube 86 and the evaporator 12 is throttled and since liquid refrigerant continues to bleed into the tube 86 past the valve element 91, the pressure within the tube 86 increases. As the pressure within the tube 86 increases so does the vaporization temperature of the refrigerant therein increase. The bimetallic element 94 responding to this increase in vaporization temperature operates to move the valve member 91 towards its valve seat to restrict the bleed from the expansible chamber 54 of the expansion valve 25. This causes the expansible chamber 54 to expand to move the valve element 57 towards its seat 50 to throttle the flow of refrigerant to the evaporator 12 whereupon less refrigerant is supplied to the evaporator and the superheat at the evaporator outlet is increased. In this way as the valve 105 is gradually moved toward the closed position, the superheat responsive device 30 controls the expansion valve 25 to decrease gradually the flow of refrigerant to the evaporator 12 and accordingly to increase gradually the superheat maintained at the evaporator outlet. As the valve 105 is moved toward the open position, the reverse action takes place, namely, the superheat at the evaporator outlet is gradually decreased. In other words, for every position of the valve 105 a corresponding degree of superheat is maintained at the evaporator outlet. When the valve 105 is completely closed to interrupt communication between the superheat responsive controller 30 and the evaporator 11, the expansion valve 25 is closed off substantially completely. Accordingly, the effective cooling area or the cooling capacity of the evaporator 12 may be graduatingly varied from 100% to 0%, depending upon the position of the control device 31.

The control device 31 may be manually operated for manually adjusting the superheat of the refrigerant at the evaporator outlet and hence the amount of liquid refrigerant in the evaporator 12 or it may be automatically adjusted in accordance with the condition of the medium being controlled by the evaporator 12 such as space temperature or relative humidity. In order to accomplish this the casing 100 is provided with a support 110 upon which is mounted a proportioning motor 111 which operates a shaft 112 which in turn operates a cam 113 for positioning the valve 105. The proportioning motor may be of the type shown and described in D. G. Taylor Patent 2,028,110, issued January 14, 1936. Power is supplied to this proportioning motor by means of line wires 114 and 115 leading from some source of power not shown and this proportioning motor may be provided with control terminals 116, 117 and 118.

The device 32 responsive to the condition of the medium being controlled by the evaporator is shown here for purposes of illustration to be a controller responsive to the temperature of the air in the space being conditioned. This controller may comprise a bellows 120 charged with a volatile fluid for operating a slider 121 against the action of an adjustable spring 122. The slider 121 cooperates with a resistance element 123 which is connected across the control terminals 116 and 117 by means of wires 124 and 125. The slider 121 is connected to the control terminal 118 by a wire 126 and the slider 121 and the resistance element 123 form a control potentiometer for graduatingly or proportionately positioning the proportioning motor 111 and hence the valve 105 all as thoroughly pointed out in the above referred to D. G. Taylor patent. It is here noted that the temperature within the space is high and that the slider 121 is engaging the upper end of the resistance element 123 and accordingly the valve 105 is in the wide open position so that the minimum degree of superheat and hence the maximum amount of refrigerant within the evaporator is being maintained by the superheat responsive control device 30. As the space temperature decreases the slider 121 moves downwardly and the valve 105 is proportionately closed. This as pointed out above, moves the valve element 57 of the expansion valve 25 towards its seat 50 to decrease the supply of refrigerant to the evaporator 12 and hence to decrease the amount of liquid refrigerant within the evaporator 12. When the space temperature reaches the lower extremity the valve 105 is closed and therefore the expansion valve 25 is closed and substantially no refrigerant is present in the evaporator 12. Upon an increase in space temperature the opposite control action takes place.

In Figures 2 and 3 there is illustrated a modified superheat responsive device for accomplishing the same results as are accomplished by the superheat responsive device of Figure 1. In Figure 2 the superheat responsive device may comprise a tube 130 which is adapted to be strapped to the suction line at the outlet of the evaporator. The tube 130 is closed at one end by a wall 131, the tube being soldered to the wall in order to prevent the escape of refrigerant through the joint. Telescopically mounted in the tube 130 is one end of a tube 132 which in turn may be soldered to the tube 130. The other end of the tube 132 is soldered to a closure member 133. The tube 130 is provided with a detent 134 for holding in place a wall 135. One end of a bimetallic element 136 located within the tube 130 is suitably secured to the end wall 131 as by soldering and the other end of this bimetallic element is suitably secured to a pin 137 rotatably mounted in the wall 135. Located in the tube 132 is a bimetallic element 138, one end of this bimetallic element being suitably secured to the pin 137.

The closure member 133 is provided with a projection 140. This projection 140 is in turn provided with an ear 141 and a pin 142 mounted on the closure member 133 cooperates with the ear 141 to pivot the downwardly extending leg 143 of the bimetallic element 138. Located in the closure member 133 is a passage 144 and this passage is provided with a valve seat member 145 which is controlled by the downwardly extending leg 143 of the bimetallic element 138. The passage 144 is connected to the bleed line 69 leading from the expansion valve 25. A passage 146 extending through the closure member 133 connects to the bleed line 69 leading to the evaporator or the suction line.

When the bimetallic elements 136 and 138 operate to move the leg 143 towards the valve seat member 145 the bleeding action through the bleed line 69 from the expansion valve 25 is throttled to move the expansion valve 25 towards the closed position. When the bimetallic elements 136 and 138 operate to move the leg 143 away from the valve seat member 145, the bleeding action is increased to move the expansion valve 25 towards the open position. The superheat responsive control device of Figures 2 and 3 operates in exactly the same way as the superheat responsive control device of Figure 1 and therefore a further description thereof is not considered necessary. The main difference between the arrangement of Figures 2 and 3 and that of Figure 1 is the valve arrangement. In Figure 1 a valve element carried by a rotatable plug is utilized while in Figure 2 the valve action is accomplished directly by the leg 143 of the bimetallic element 138.

The control arrangement of Figure 4 is substantially the same as that of Figure 1 with three exceptions: (1) in Figure 4 the control device 31 is located in the bleed line 69 between the expansion valve 25 and the superheat responsive control device 30, (2) the bleed line 69 connects into the suction line 26 instead of into the evaporator 12, and (3) the control device 32 responsive to the condition of the medium being controlled by the evaporator 12 is shown to be a relative humidity responsive device in place of a temperature responsive device. Like reference characters have been utilized in Figures 1 and 4 for like parts.

The humidity responsive control device 32 of Figure 4 may comprise a hygroscopic element 150 for operating a lever 151 against the action of an adjustable tension spring 152. The lever 151 carries a slider 153 which is adapted to slide across a resistance element 154. The slider 153 and the resistance element 154 form a control potentiometer for controlling the operation of the proportioning motor 111. The right end of the resistance element 154 is connected to the control terminal 116 by a wire 155 and the left end is connected by a wire 156 to the control terminal 117. The slider 153 is connected by a wire 157 to the control terminal 118.

With the parts in the position shown in Figure 4 the relative humidity in the space is low and the slider 153 is at the right hand end of the resistance element 154. Accordingly the valve of the control device 31 is wide open and the expansible chamber of the expansion valve 25 is connected to the superheat responsive device 30 by the bleed line 69. The superheat responsive device 30 operates under these conditions to position the expansion valve 25 to maintain a predetermined minimum degree of superheat at the evaporator outlet, for example, 10° of superheat as pointed out in connection with Figure 1. The effective cooling area of the evaporator 12 is at a maximum and therefore the evaporator temperature is relatively high whereupon the evaporator 12 performs more sensible cooling than latent cooling. As the relative humidity in the space increases the slider 153 moves to the left with respect to the resistance element 154 to move the valve of the control device 31 towards a closed position. This acts to throttle the bleed line 69 to move the expansion valve 25 towards a closed position to decrease the supply of refrigerant to the evaporator 12. As a result the effective cooling area of the evaporator 12 decreases and the temperature of the evaporator 12 decreases to increase the amount of latent cooling with respect to the amount of sensible cooling. Thus the expansion valve 25 is positioned in accordance with the amount of relative humidity within the space being conditioned and the effective cooling area and temperature of the evaporator 12 is likewise varied. In this modification whenever the valve of the control device 31 operates to decrease the bleeding action from the expansible chamber of the expansion valve 25 it acts as the primary control, the superheat responsive control device 30 not functioning at this time. The only time that the superheat responsive device 30 comes into play is when the valve of the control device 31 is wide open and then it operates to maintain the 10° superheat at the evaporator outlet. In other words, in the control arrangement of Figure 4 the superheat responsive device 30 operates as a limit control to prevent the superheat at the evaporator outlet from decreasing below the predetermined value, 10° as illustrated, and the control device 31 operates as the main control of the effective cooling area of the evaporator 12. Outside of this distinction in operation the systems of Figures 1 and 4 operate in substantially the same manner. It is obvious that the superheat responsive device of Figures 2 and 3 may be utilized in the arrangement of Figure 4 in place of the one shown. Further, the bleed line 69 could connect into the evaporator 12 instead of into the suction line 26 as shown. Also, a temperature responsive device could be utilized in place of the relative humidity responsive device.

A modified control arrangement is illustrated in Figure 5, wherein a T fitting 160 is located in the suction line 26 leading from the evaporator to the compressor. The T fitting 160 is provided with a coupling 161 in which is suitably secured as by soldering the superheat responsive control device 30. Figure 5 contemplates the use of the superheat responsive control device shown in Figures 2 and 3 and in adapting this superheat responsive control device to the arrangement of Figure 5 the tube 130 is provided with openings 162 so that the superheated refrigerant passing from the evaporator to the compressor may flow directly over the bimetallic element 136. The bimetallic element 136 therefore operates in response to the actual temperature of the refrigerant leaving the evaporator. Liquid refrigerant from the expansion valve passes through the bleed line 69 under the control of the control device 31 into the tube 132. The two bimetallic elements 136 and 138 cooperate to regulate the flow of refrigerant from the bleed line 69 into the tube 132 in the manner pointed out above in connection with Figures 2 and 3. The bimetallic element 138 responds to the vaporization temperature of the liquid refrigerant in the tube 132 and this bimetallic element operating in conjunction with the bimetallic element 136 operates to maintain the superheat of the refrigerant at the evaporator outlet at a desired value, namely 10°. Some of the liquid refrigerant in the tube 132 vaporizes to cool the thermostatic element 138 and then passes through the wall 135 around the pin 137 and the pressure within the tube 132 corresponds to the pressure in the fitting 160 and hence the pressure in the suction line 26 at the outlet of the evaporator. Thus the bimetallic element 138 operates in accordance with changes in pressure at the evaporator outlet. Since the refrigerant passing from the tube 132 passes through the wall 135 into the suction line 26 there is no need for the additional connection that is utilized in Figures 1 to 4 for connecting the interior of the tube 132 to the evaporator. The control arrangement of Figure 5 operates in substantially the same manner as the control arrangement of Figure 4 and therefore a description of the mode of operation is not considered necessary. In order to prevent liquid refrigerant from contacting the bimetallic element 136 a baffle 163 is secured to the pin 137. The bimetallic element 136 therefore can only respond to the actual temperature of the superheated refrigerant at the evaporator outlet.

While in Figures 1 to 5 the superheat responsive control device 30 acts as a pilot control for a main expansion valve it may be utilized to control the flow of refrigerant directly to the evaporator especially in a small refrigerating apparatus. Such an arrangement is illustrated in Figure 6. Here the superheat responsive control device of Figure 1 is shown to be strapped to the suction line 166 leading from the evaporator 12 to the compressor. Liquid refrigerant from the condenser passes through a liquid line 165 under the control of the valve member 91 into the tube 86 of the superheat responsive control device. Liquid refrigerant flows from the tube 86 into the evaporator 12. The pressure within the tube 86 is the same as that existing in the evaporator 12 so that the superheat responsive device acts to maintain a constant degree of superheat at the evaporator outlet. It is thus seen that in Figure 6 the valve element 91 operates directly as the expansion valve for the evaporator 12 and is controlled to maintain the superheat at the evaporator outlet at a substantially constant value. Here the superheat maintained at the evaporator outlet may be suitably varied by adjusting the screw 76.

Figure 7 illustrates still a further form of control arrangement and it comprises the expansion valve 25 for controlling the supply of refrigerant to the evaporator 12. Figure 7 contemplates the use of the superheat responsive control device of Figures 2 and 3 the same being suitably clamped to the suction line 26 by a strap 73. The superheat responsive control device 30 controls the bleed line 69 leading from the expansion valve 25 to maintain a desired degree of superheat at the evaporator outlet. Instead of adjusting the degree of superheat maintained by the superheat responsive device 30 in the manners illustrated in Figures 1 to 5 this is accomplished by applying variable degrees of auxiliary heat to the bimetallic element 136. In carrying out this feature of the invention the tube 130 is closed at one end by a member 170 having a reentrant tube 171 extending coaxially within the coiled bimetallic element 136. A heater 172 is located within the re-entrant tube 171 for applying false heat to the bimetallic element 136. The heater is controlled by a control device 173 responsive to the condition of the medium being cooled by the evaporator 12. For purposes of illustration this control device is shown to comprise a thermostat having a bellows 174 charged with a volatile fluid for opearting a slider 175 against the action of an adjustable tension spring 176. The slider 175 is adapted to slide across the resistance element 177. Power is supplied to the heater 172 from line wire 178 through slider 175, resistance element 177, wire 179 and auxiliary heater 172 back to the other line wire 180.

With the parts in the position shown in Figure 7 the temperature within the space is high and maximum heat is being supplied by the auxiliary heater 172 to the bimetallic element 136. The bimetal elements 136 and 138 are so arranged in this modification that under conditions of maximum auxiliary heat supply the superheat at the evaporator outlet is maintained at say 10°. As the space temperature decreases the slider 175 moves downwardly to decrease the heating effect of the auxiliary heater 172. The bimetallic element 136 thereupon cools down to cause a decrease in the bleeding action through the bleed line 69 to cause the expansion valve 25 to move towards a closed position. This decreases the effective cooling area of the evaporator 12. As the space temperature decreases further to decrease further the supply of heat given off by the auxiliary heater 172, the bleeding action through the bleed line 69 is further decreased to move the expansion valve 25 still further towards the closed position. This decreases still a greater amount the effective cooling area of the evaporator 12. Thus it is seen for every position of the slider 175 the superheat responsive control device 30 is adjusted to maintain a corresponding degree of superheat at the evaporator outlet and hence a corresponding effective cooling surface of the evaporator 12.

In Figure 8 there is illustrated a superheat responsive control device which utilizes linearly expanding elements as distinguished from the bimetallic elements utilized in Figures 1 to 7. The control device of Figure 8 accomplishes the same results as are accomplished by the control devices in Figures 1 to 7. The control device of Figure 8 comprises a tube 185 which is strapped to the suction line 126 by a strap 186. One end of the tube 185 is suitably soldered to a wall 187 and the other end is suitably soldered to a closure member 188. The wall 187 is provided with a shoulder 189 to which is soldered one end of a tube 190. The other end of the tube 190 is slidably carried by a shoulder 191 formed on the closure member 188. The wall 187 is provided with a valve element 192 which cooperates with the end of a tube 193 soldered into the closure member 188. The tube 193 extends to the expansible chamber of the expansion valve 25 and therefore forms a bleed line from the expansion valve. The space between the tubes 190 and 193 is connected by a pipe 195 to the suction line 26 so that the pressure on the inside of the control device corresponds to the pressure of the refrigerant at the evaporator outlet. Some of the liquid refrigerant passing from the expansion valve through the tube 193 into the control device evaporates at a pressure corresponding to the pressure of the refrigerant at the evaporator outlet and the tube 193 expands and contracts in accordance with the vaporization temperature of the refrigerant. As the pressure decreases the vaporization temperature decreases to cause the tube 193 to move away from the valve element 192 to increase the bleeding action from the expansion valve 25 whereupon the expansion valve moves towards the open position to increase the flow of refrigerant to the evaporator. Conversely upon an increase in pressure the vaporization temperature increases and the tube 193 expands so that the end thereof moves more closely to the valve element 192 to decrease the bleeding action from the expansion valve 25. This causes movement of the expansion valve towards the closed position to decrease the supply of refrigerant to the evaporator. Thus it is seen that the expansion valve is positioned in accordance with the pressure of the refrigerant at the evaporator outlet.

The tube 190 is utilized for the purpose of preventing liquid refrigerant from engaging the tube 185 and since the tube 185 is strapped to the suction line 26 the temperature of the tube 185 corresponds to the temperature of the superheated refrigerant leaving the evaporator. Upon an increase in temperature of the superheated refrigerant leaving the evaporator the tube 185 expands to move the valve element 192 away from the tube 193. This increases the bleeding action from the expansion valve 25 to supply more refrigerant to the evaporator. Upon a decrease in temperature of the superheated refrigerant leaving the evaporator the tube 185 contracts to move the valve element 192 toward the tube 193 which decreases the bleeding action from the expansion valve 25. This in turn decreases the supply of refrigerant to the evaporator. It is thus seen that the expansion valve 25 is therefore positioned in accordance with the temperature of the superheated refrigerant at the evaporator outlet and since the expansion valve 25 is also positioned in accordance with the vaporization temperature and hence the pressure of the refrigerant in the evaporator, then the expansion valve 25 is positioned directly in accordance with the superheat at the evaporator outlet. It is therefore seen that the superheat responsive control device of Figure 8 operates in exactly the same manner as the superheat control devices of Figures 1 to 7. In order to adjust the superheat maintained in the evaporator the control device 31 may be utilized. This control device 31 may be located in the bleed line 193 as taught by Figure 4 or it may be located in the bleed line 195 as taught by Figure 1. The control device may be operated in any suitable manner. Also the superheat responsive control device of Figure 8 may be utilized for directly controlling the supply of refrigerant to the evaporator in the manner taught by Figure 6.

Referring now to Figure 9 there is illlustrated still another form of a superheat responsive control device utilizing volatile fluid actuated bellows as the thermostatic elements in lieu of the preceding arrangements. In Figure 9 a cup shaped member 200 may be clamped to the suction line 26 by a strap 201. The cup-shaped member 200 is soldered to a wall 202. Another cup-shaped member 203 is also soldered to the wall 202 on the other side thereof. A bellows 204 having an end wall 205 is located within the cup-shaped member 200 and is suitably secured to the wall 202. A bellows 206 having an end wall 207 is located in the cup-shaped member 203 and is also secured to the wall 202. Preferably the bellows 204 and 206 are the same size so that they will not be affected by changes in pressure conditions existing therein. The end walls 205 and 207 are suitably connected together as by rods 208 extending through apertures 209 in the wall 202, the end walls 205 and 207 being thus connected together to operate together. A bleed line 210 leading from the expansion valve opens into the aperture 209 and liquid refrigerant from this bleed line passes into the interior of the bellows 204 and 206. The liquid refrigerant passes out of the bellows 204 and 206 through a passage 211 in the wall 202, through a coiled tube 212 surrounding the bellows 206 and through a bleed line 213 into the suction line 26. A rod 214 is secured to the movable wall 207 and is provided with a valve element 215 cooperating with a valve seat 216 associated with the passage 211.

The space between the cup-shaped member 200 and the bellows 204 is charged with a volatile fluid and this volatile fluid tends to expand and contract the bellows 204 in accordance with the temperature of the superheated refrigerant leaving the evaporator. This is true since the cup-shaped member 200 is strapped to the suction line 26. The space between the cup-shaped member 203 and the bellows 206 is also charged with a volatile fluid and this volatile fluid will expand and contract the bellows 206 in accordance with the temperature of the refrigerant vaporizing in the coiled tube 212. Since the pressure existing within the coiled tube 212 corresponds to the evaporator pressure, then the temperature of the vaporizing refrigerant in the coiled tube 212 varies in accordance with the pressure existing within the evaporator. The volatile fluid surrounding the bellows 206 responding to the vaporization temperature expands and contracts the bellows 206 in accordance with the vaporization temperature corresponding to the pressure in the evaporator. The bellows 206 is therefore expanded and contracted in accordance with pressure conditions within the evaporator.

Upon an increase in the temperature of the superheated refrigerant at the evaporator outlet the volatile fluid in the cup-shaped member 200 expands to move the valve 215 away from the seat 216 and this increases the bleeding action from the expansion valve 25 to move the valve towards an open position for supplying more refrigerant to the evaporator. Upon a decrease in temperature of the superheated refrigerant the bellows 204 moves the valve 215 towards the valve seat 216 to decrease the bleeding action from the expansion valve 25 to decrease the supply of refrigerant to the evaporator. Accordingly the supply of refrigerant to the evaporator is controlled in accordance with the temperature of the superheated refrigerant at the evaporator outlet. Upon an increase in pressure in the evaporator the vaporization temperature increases to cause the volatile fluid in the cup-shaped member 203 to move the valve element 215 towards the valve seat 216. This decreases the bleeding action from the expansion valve 25 to decrease the supply of refrigerant to the evaporator. Upon a decrease in pressure in the evaporator the vaporization temperature decreases and the bellows 206 moves the valve element 215 away from the valve seat 216 to increase the bleeding action from the valve seat 25 for increasing the supply of refrigerant to the evaporator. Accordingly the expansion valve 25 is positioned in accordance with the pressure conditions within the evaporator and since the expansion valve is also positioned in accordance with the temperature of the superheated refrigerant at the evaporator outlet, the expansion valve is positioned by the superheat responsive controller of Figure 9 to maintain desired superheat conditions at the evaporator outlet. Thus the arrangement of Figure 9 operates in exactly the same way as the arrangements of Figures 1 to 8.

If it be desired to adjust the superheat maintained at the evaporator outlet the control device 31 may be placed in the bleed line 210 as tought by Figure 4 or it may be placed in the bleed line 213 leading to the suction line 26 as tought in Figure 1. The superheat adjustment of the arrangement of Figure 9 is exactly the same as that pointed out above and therefore a further description is not considered necessary.

In order to maintain the superheat of the refrigerant at the evaporator outlet substantially constant over a wide range of pressure and temperature conditions the bimetallic elements of Figures 1 to 7 are of substantially the same length, the tubes 185 and 193 of Figure 8 are made of like material and the volatile fluids contained in the cup members 200 and 203 of Figure 9 are similar. In other words, the thermostatic elements of these figures are substantially equally sensitive to temperature changes. However, if it be desired to have the superheat at the evaporator outlet increase as the evaporator pressure or temperature increases then it is necessary to have the thermostatic means which is operated in accordance with evaporator pressure more active than the other thermostatic means which responds to the temperature of the superheated refrigerant. This may be accomplished in Figures 1 to 7 by making the bimetallic element which operates in accordance with evaporator pressure of more active material or by increasing the length thereof. This may be accomplished in Figure 8 by making the tube 193 more active than the tube 185 and in Figure 9 a more active volatile fill may be utilized in the cup member 203. By reason of such arrangement the amount of refrigerant delivered to the evaporator is decreased as the cooling load increases and therefore the load on the compressor motor is decreased and this type of operation may be beneficial where it is desirable to limit the load on the compressor motor. If on the other hand it be desired to have the superheat at the evaporator outlet increase as the evaporator pressure or temperature decreases the reverse arrangement may be utilized, namely one wherein the thermostatic means which is operated in accordance with evaporator pressure is less active than the thermostatic means responsive to the temperature of the superheated refrigerant. Such an arrangement may be beneficially utilized for shifting the load from one evaporator to another in a multiple evaporator system.

Referring now to Figure 10 there is illustrated an arrangement for maintaining a substantially constant pressure within the evaporator at all times. Such an arrangement would be utilized with a refrigerating apparatus having a limited charge of refrigerant. In Figure 10 refrigerant is supplied through a liquid line 24 under the control of an expansion valve 25 to the evaporator 12 and evaporated refrigerant is withdrawn from evaporator 12 through a suction line 26. The bleed line 69 leading from the expansion valve 25 is controlled by the control device 31 and a pressure responsive control device 220. The control device 31 is the same as that illustrated in the previous figures.

The constant pressure control device 220 may comprise a tube 221 closed at one end by a wall 222 and at the other end by a closure member 223. An adjusting screw 224 locked in place in the end wall 222 by a lock nut 225 carries a shoulder 226 upon which is mounted one end of a bimetallic element 227. The other end of the bimetallic element 227 operates a screw member 228 carrying a valve element 229 cooperating with a valve seat 230. The bleed line 69 leading from the expansion valve connects into the valve seat 230 and the bleed line 69 for conducting refrigerant from the constant pressure responsive device 220 to the suction line 226 is connected by a passage 231 into the interior of the tube 221. The pressure within the tube 221 corresponds to the pressure existing within the evaporator 12 and the refrigerant within the tube 221 expanding at this pressure will have a vaporization temperature corresponding to this pressure. The bimetallic element 227 responding to this vaporization temperature operates the valve element 229 to control the bleeding action from the expansion valve 25 in accordance with the vaporization temperature and hence the pressure existing within the evaporator 12. Upon an increase in pressure the bimetallic element moves the valve element 229 towards the seat 230 to decrease the bleeding action from the expansion valve 25 to reduce the supply of refrigerant to the evaporator 12. Upon a decrease in pressure in the evaporator 12 the bimetallic element 227 moves the valve element 229 away from the seat 230 to increase the bleeding action from the expansion valve 25 to increase the supply of refrigerant to the evaporator 12. Accordingly the expansion valve 25 is adjusted in accordance with the pressure existing within the evaporator 12 to maintain the pressure therein substantially constant.

The control device 31 is shown as being located in the bleed line 69 between the expansion valve 25 and the constant pressure responsive device 220 and this control device 31 operates to regulate the bleeding action from the expansion valve 25 to change the pressure conditions existing within the evaporator 12 in substantially the same manner as the effective cooling surface of the evaporator is varied in Figure 4. Instead of locating the control device 31 in the bleed line 69 in the position shown in Figure 10 it could be located in the bleed line 69 between the pressure responsive device 220 and the suction line 26 and under these conditions the control device 31 would operate to vary the pressure in the evaporator 12 in the same manner that the control device 31 of Figure 1 varies the effective cooling surface of the evaporator of Figure 1.

Instead of controlling the expansion valve 25 by a superheat responsive control device as in Figures 1 to 5 and 7 to 9 or by a pressure responsive control device as in Figure 10, Figure 11 illustrates the control of the expansion valve 25 by means of a low pressure float arrangement. In Figure 11 liquid refrigerant flows from the condenser through the liquid line 24 under the control of the expansion valve 25 into a low pressure float chamber or suction trap 235. The evaporator 12 is connected into the lower portion and the upper portion of the float chamber 235 so that the level of the liquid in the evaporator 12 corresponds to the level of the liquid in the float chamber 235. Evaporated refrigerant is conducted from the evaporator 12 and the float chamber 235 by a suction line 26. Located in the float chamber 235 is a float 236 carried by an arm 237 pivoted at 238. The float 236 rises and falls in accordance with the level of the refrigerant in the float chamber 235. The lever 237 carries a valve 239 which controls the bleed line 69 and if desired the bleed line 69 may also be controlled by the control device 31. When the level of the liquid refrigerant in the float chamber 235 decreases, the float 236 moves downwardly to move the valve 239 away from its seat which increases the bleeding action from the expansion valve 25 to supply more refrigerant to the float chamber 235 and hence the evaporator 212. When the level of the liquid refrigerant in the float chamber 235 rises the float 236 moves the valve 239 towards its seat to decrease the bleeding action from the expansion valve 25 to decrease the supply of refrigerant to the float chamber 235 and the evaporator 12. Thus, the expansion valve 25 is positioned to maintain a substantially constant level of liquid refrigerant in the float chamber 235 and the evaporator 12.

If now the valve of the control device 31 is moved toward a closed position the bleeding action from the expansion valve 25 is decreased whereupon the expansion valve 25 is positioned to decrease the supply of liquid refrigerant to the evaporator 12 and the float chamber 235. Accordingly the control device 31 operates to adjust the level of the liquid refrigerant maintained in the evaporator 12 and the float chamber 235. In this way the effective cooling area of the evaporator 12 may be varied at will and still provision is made for preventing the level of the liquid refrigerant from becoming too high.

In Figure 12 the expansion valve 25 is controlled by a high pressure float control device instead of a superheat responsive device, a pressure responsive control device or a low pressure responsive float control device as illustrated in the preceding figures. Here liquid refrigerant flows from the condenser 23 into a high pressure float chamber 245 and then flows through the liquid line 24 and the expansion valve 25 into the evaporator 12. The high pressure float chamber 245 is connected by a pipe 246 to the high pressure line 22 so that the pressures in the high pressure float chamber 245 and the condenser 23 are equalized. Located in the high pressure float chamber 245 is a float 247 carried by a lever 248 pivoted at 249. The lever 248 extends into a control chamber 240 which is sealed off from the high pressure float chamber 245 by a bellows 251. The lever 248 operates a valve 252 which in turn is located in the bleed line 69 from the expansion valve 25 for controlling the bleeding action from the expansion valve 25. If desired the bleed line 69 may also be controlled by the control device 31. Here the control device 31 is shown to be located in the bleed line 69 between the high pressure float control device and the evaporator 12. It is obvious from the preceding figures that the control device 31 may be located in the bleed line 69 between the high pressure float control device and the expansion valve 25. The bleed line 69 is also shown to connect into the refrigerating system between the expansion valve 25 and the evaporator 12 but it might just as well be connected into some portion of the evaporator 12 or into the suction line 26.

The type of control arrangement shown in Figure 12 is preferably utilized in a refrigerating apparatus having a limited charge of refrigerant. Upon a rise in the level of the refrigerant in the float chamber 245 the float 247 is raised to move the valve element 252 away from its seat. This increases the bleeding action from the expansion valve 25 to admit more refrigerant into the evaporator 12. Upon lowering of the level of the liquid refrigerant in the float chamber 245 the float lowers to move the valve element 252 towards its seat to decrease the bleeding action from the expansion valve 25. This in turn decreases the flow of refrigerant into the evaporator 12. The high pressure float control device therefore positions the expansion valve 25 to regulate the flow of refrigerant into the evaporator 12 to maintain the effective cooling area of the evaporator 12 substantially constant.

If now the valve of the control device 31 is moved towards a closed position the bleeding action from the expansion valve 25 is decreased to decrease the flow of refrigerant to the evaporator 12 and therefore the effective cooling area of the evaporator 12 may be decreased in accordance with the position of the control device 31.

While for purposes of illustration various forms of this invention have been disclosed, other forms thereof may become apparent to those skilled in the art upon reference to this disclosure and therefore this invention is to be limited only by the scope of the appended claims.

I claim as my invention:

1. In a control system for a refrigerating apparatus having an evaporator for controlling the condition of a medium, the combination of, an expansion valve for regulating the supply of refrigerant to the evaporator, said expansion valve being urged closed by spring means, pressure responsive means for operating said valve, the operating pressure applied to said pressure responsive means being due entirely to refrigerant circulated through said apparatus, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, modulating valve means for regulating the flow of refrigerant through the last mentioned passage to position the expansion valve, and means responsive to the condition of the medium being controlled by the evaporator for regulating the modulating valve means.

2. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, control valve means for regulating the flow of refrigerant through the last mentioned passage to position the expansion valve, and means responsive to the superheat of the refrigerant at the evaporator outlet for regulating the control valve means to maintain desired superheat conditions at the evaporator outlet.

3. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, control valve means for regulating the flow of refrigerant through the last mentioned passage to position the expansion valve, and means for regulating the control valve means including temperature responsive means within an expansion chamber wherein refrigerant pressing through said passages may be vaporized.

4. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, control valve means for regulating the flow of refrigerant through the last mentioned passage to position the expansion valve, means for regulating the control valve means to maintain desired superheat conditions at the evaporator outlet including means actuated in response to the temperature of the refrigerant at the evaporator outlet and means actuated in response to refrigerant pressure, and means responsive to the conditions of the medium being controlled by the evaporator for regulating said refrigerant pressure.

5. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, control valve means for regulating the flow of refrigerant through the last mentioned passage to position the expansion valve, means for regulating the control valve means including an expansion chamber wherein refrigerant may vaporize, and means responsive to the condition of the medium being controlled by the evaporator means for regulating the pressure within said expansion chamber.

6. In a control system for a refrigerating apparatus having an evaporator for controlling the condition of a medium, the combination of, an expansion valve for regulating the supply of refrigerant to the evaporator, pressure responsive means for operating said valve, said valve being operated to open positions solely by pressure exerted by refrigerant circulated through said apparatus, means including a passage for supplying refrigerant from the upstream side of the valve to the pressure responsive means and for bleeding refrigerant from the pressure responsive means to the downstream side of the valve, a plurality of control valves in said passage for regulating the pressure of the refrigerant on said pressure responsive means to position the expansion valve, means operating one of said control valves in response to a condition of said medium, and means operating another of said control valves in response to the temperature of the refrigerant leaving the evaporator.

7. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, a control valve in said passage for regulating the pressure of the refrigerant on said pressure responsive means to position the expansion valve, means for regulating the control valve including means actuated in response to refrigerant pressure, and a second control valve in said passage for regulating said refrigerant pressure.

8. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, valve means in said passage for regulating the pressure of the refrigerant on said pressure responsive means to position the expansion valve, thermostatic means for operating the valve means, means for passing liquid refrigerant adjacent the thermostatic means so that the thermostatic means operates the valve means in accordance with the temperature of the refrigerant, and means for subjecting the refrigerant adjacent the thermostatic means to the pressure within the evaporator to cause the temperature thereof to correspond to the pressure in the evaporator whereby the thermostatic means operates the valve means in response to the pressure in the evaporator.

9. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, valve means in said passage for regulating the pressure of the refrigerant on said pressure responsive means to position the expansion valve, first thermostatic means responsive to the temperature of the superheated refrigerant at the evaporator outlet for operating the valve means, second thermostatic means operating in opposition to the first thermostatic means for also operating the valve means, means for passing liquid refrigerant adjacent the second thermostatic means so that the second thermostatic means operates in accordance with the temperature of the refrigerant, and means for subjecting the refrigerant adjacent the thermostatic means to the pressure within the evaporator to cause the temperature thereof to correspond to the pressure in the evaporator, whereby the valve means and hence the expansion valve are positioned in response to the superheat of the refrigerant at the evaporator outlet.

10. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, valve means in said passage for regulating the pressure of the refrigerant on said pressure responsive means to position the expansion valve, thermostatic means for operating the valve means, means for passing liquid refrigerant adjacent the thermostatic means so that the thermostatic means operates the valve means in response to the temperature of the refrigerant, means for subjecting the refrigerant adjacent the thermostatic means to pressure to cause the temperature thereof to correspond to said pressure whereby the thermostatic means operates the valve means in response to said pressure, and other valve means located in said passage for acting in conjunction with the first named control valve in the regulation of the pressure in said pressure responsive means to thus influence the position of the expansion valve.

11. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, valve means in said passage for regulating the pressure of the refrigerant on said pressure responsive means to position the expansion valve, first thermostatic means responsive to the temperature of the superheated refrigerant at the evaporator outlet for operating the valve means, second thermostatic means operating in opposition to the first thermostatic means for also operating the valve means, means for passing liquid refrigerant adjacent the second thermostatic means so that the second thermostatic means operates in response to the temperature of the refrigerant, means for subjecting the refrigerant adjacent the thermostatic means to pressure ranging upwardly from that within the evaporator to cause the temperature thereof to correspond to said pressures, and other valve means located in said passage for acting in combination with said first named valve means in the regulation of the pressure in said pressure responsive means.

12. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, valve means for regulating the flow of refrigerant through the last mentioned passage to position the expansion valve, thermostatic means for operating the valve means, and means positioning liquid refrigerant from said last mentioned passage adjacent the thermostatic means at a pressure corresponding to the pressure in the evaporator.

13. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, valve means for regulating the flow of refrigerant through the last mentioned passage to position the expansion valve, first thermostatic means responsive to the temperature of the superheated refrigerant at the evaporator outlet for operating the valve means, second thermostatic means operating in opposition to the first thermostatic means for also operating the valve means, and means positioning liquid refrigerant from said last mentioned passage adjacent the second thermostatic means at a pressure corresponding to the pressure in the evaporator.

14. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, valve means for regulating the flow of refrigerant through the last mentioned passage to position the expansion valve, thermostatic means for operating the valve means, means positioning liquid refrigerant from said last mentioned passage adjacent the thermostatic means at a pressure at least as high as that within the evaporator, and other valve means located in said last mentioned passage for acting in conjunction with said first named valve means in the regulation of the pressure in said pressure responsive means for positioning the expansion valve.

15. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, valve means for regulating the flow of refrigerant through the last mentioned passage to position the expansion valve, first thermostatic means responsive to the temperature of the superheated refrigerant at the evaporator outlet for operating the valve means, second thermostatic means operating in opposition to the first thermostatic means for also operating the valve means, means introducing liquid refrigerant from said last mentioned passage adjacent to the second thermostatic means at a pressure above the pressure in the evaporator, and other valve means located in said last mentioned passage for regulating the pressure on the refrigerant adjacent the second thermostatic means.

16. In a refrigerating apparatus having an evaporator supplied with refrigerant for controlling the condition of a medium, control means for regulating the flow of refrigerant to the evaporator including, a first thermostatic bellows means responsive to the termperature of the superheated refrigerant at the evaporator outlet so that it operates in accordance with the temperature thereof, a second thermostatic bellows means operating in opposition to the first thermostatic bellows means, means introducing liquid refrigerant into the second thermostatic bellows so that the second thermostatic bellows means operates in accordance with the temperature of the refrigerant, means for subjecting the refrigerant within the second thermostatic bellows to the pressure within the evaporator to cause the temperature thereof to correspond to that associated with the pressure in the evaporator whereby the second thermostatic bellows means operates in response to the pressure in the evaporator, and valve means operated by both thermostatic bellows means.

17. In a refrigerating apparatus, in combination, hollow body means having a plurality of chambers separated by partition means, first thermostatic means associated with one of said chambers, second thermostatic means associated with another of said chambers, said body means being arranged to be clamped to the outlet portion of an evaporator in such manner that said one chamber will be in heat exchange relation therewith so that said first thermostatic means will respond to the temperature of said evaporator outlet portion, means for introducing refrigerant into said other chamber to control the temperature of said second thermostatic means, said first and second thermostatic means being arranged to oppose each other, control means operated by said first and second thermostatic means to regulate the introduction of refrigerant into said other chamber, means for connecting said other chamber to said evaporator so that refrigerant in said chamber may be maintained at least at evaporator pressure, and means for adjusting at least one of said thermostatic means.

18. In a refrigerating apparatus having an evaporator supplied with refrigerant for controlling the condition of a medium, a device operated in response to the conditions of the refrigerant at the evaporator outlet comprising, in combination, first bimetallic thermostatic means operated in response to the temperature of the refrigerant at the evaporator outlet, second bimetallic thermostatic means operatively opposed to said first thermostatic means, control means operated in response to the resultant of the operation of said first and second thermostatic means, enclosure means surrounding said second thermostatic means, and means introducing refrigerant into said enclosure and through and around said second bimetallic thermostatic means for controlling the temperature of same.

19. In apparatus for a refrigerating system, a control device comprising, in combination, a tubular body portion having a first portion and a second portion, said first portion being arranged to be clamped in heat exchange relation with the outlet portion of an evaporator, partition means separating said portions to form first and second chambers, spiral bimetal members in each of said chambers, means extending through said partition means to connect said bimetal members, said bimetal members being arranged to oppose each other, adjustable support means for the bimetal member in said first chamber, valve means in said second chamber operated by the bimetal member in said second chamber, and fluid passage means through said second chamber controlled by said valve means.

20. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, adjustable control valve means for regulating the flow of refrigerant through the last mentioned passage to position the expansion valve, means responsive to the temperature of the refrigerant near the outlet of the evaporator for adjusting said control valve means, and means responsive to the condition of the medium being controlled by the evaporator acting in conjunction with said temperature responsive means for regulating said control valve.

21. In a control system for a refrigerating apparatus having an evaporator for controlling the condition of a medium, the combination of, an expansion valve for regulating the supply of refrigerant to the evaporator, pressure responsive means for operating said valve, means including a passage having a fixed resistance for supplying refrigerant from the upstream side of the valve to the pressure responsive means for closing the valve, means including a passage for bleeding refrigerant from the pressure responsive means to the downstream side of the valve for opening the valve, control valve means for regulating the flow of refrigerant through the last mentioned passage to position the expansion valve, means responsive to the temperature of the refrigerant at the evaporator outlet and to means responsive to a condition indicative of refrigerant pressure for regulating the control valve means to maintain desired superheat conditions at the evaporator outlet, and means responsive to the condition of the medium being controlled by the evaporator for varying the degrees of superheat to be maintained.

22. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and another passage for bleeding refrigerant from the pressure responsive means to the downstream side of the valve, an adjustable control valve in one of said passages and flow restricting means in the remaining passage for regulating the pressure of the refrigerant on said pressure responsive means to position the expansion valve, means for adjusting said control valve, a second control valve in the same passage as said adjustable control valve for cooperating with said adjustable control valve in the regulation of the pressure of refrigerant on said pressure responsive means, and means for regulating said second control valve.

23. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, an adjustable control valve in said passage for regulating the pressure of the refrigerant on said pressure responsive means to position the expansion valve, temperature responsive means for adjusting said control valve, a second control valve in said passage for cooperating with said adjustable control valve in the regulation of refrigerant pressure on said pressure responsive means, and means responsive to a condition of the medium being controlled by the operator for regulating the second control valve.

24. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, a control valve in said passage for regulating the pressure of the refrigerant on said pressure responsive means to position the expansion valve, means responsive to the temperature of the refrigerant at the evaporator outlet and means indicative of refrigerant pressure for regulating the control valve to maintain desired conditions at the evaporator outlet, a second control valve in said passage for acting in conjunction with said first named control valve in the regulation of the pressure of the refrigerant on said pressure responsive means, and means for regulating the second control valve to vary said desired conditions to be maintained.

25. In a control system for a refrigerating apparatus having an evaporator for controlling the condition of a medium, the combination of, an expansion valve for regulating the supply of refrigerant to the evaporator, pressure responsive means for operating said valve, means including a passage for supplying refrigerant from the upstream side of the valve to the pressure responsive means and for bleeding refrigerant from the pressure responsive means to the downstream side of the valve, a control valve in said passage for regulating the pressure of the refrigerant on said pressure responsive means to position the expansion valve, means responsive to the temperature of the refrigerant at the evaporator outlet and means indicative of refrigerant pressure for regulating the control valve to maintain desired conditions at the evaporator outlet, a second control valve in said passage for acting in conjunction with said first named control valve in the regulation of the pressure of the refrigerant on said pressure responsive means to position the expansion valve, and means responsive to the condition of the medium being controlled by the evaporator for regulating the second control valve.

26. In a refrigerating apparatus having an evaporator supplied with refrigerant for controlling the condition of a medium, a device operated in response to refrigerant conditions within the evaporator, comprising in combination, a bimetallic element, means for positioning liquid adjacent to the bimetallic element so that the bimetallic element operates in response to the temperature of the refrigerant, and means for subjecting the refrigerant adjacent the bimetallic element to the pressure within the evaporator to cause the temperature thereof to correspond to that associated with said pressure whereby the bimetallic element may operate in response to the pressure in the evaporator.

27. In a refrigerating apparatus having an evaporator supplied with refrigerant for controlling the condition of a medium, a device operated in response to a condition of the refrigerant within the outlet portion of the evaporator, comprising in combination, a first bimetallic element operative in response to the temperature of the refrigerant adjacent the evaporator outlet, a second bimetallic element operating in opposition to the first bimetallic element, means for introducing liquid refrigerant adjacent to the second bimetallic element so that the second bimetallic element operates in response to the temperature of said refrigerant, and means for subjecting the refrigerant adjacent the second bimetallic element to pressure at least as high as the pressure within the evaporator.

ALWIN B. NEWTON.